(12) United States Patent
DeVries et al.

(10) Patent No.: US 11,958,697 B2
(45) Date of Patent: Apr. 16, 2024

(54) TOLERANCE ADJUSTER AND WEAR DEVICE FOR SORTATION SYSTEM

(71) Applicant: Dematic Corp., Grand Rapids, MI (US)

(72) Inventors: Jeffrey S. DeVries, Grand Rapids, MI (US); Thomas H. Triesenberg, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 17/877,491

(22) Filed: Jul. 29, 2022

(65) Prior Publication Data

US 2023/0029676 A1 Feb. 2, 2023

Related U.S. Application Data

(60) Provisional application No. 63/226,838, filed on Jul. 29, 2021.

(51) Int. Cl.
*B65G 47/82* (2006.01)
*B65G 43/00* (2006.01)
*B65G 47/84* (2006.01)

(52) U.S. Cl.
CPC ............. *B65G 47/82* (2013.01); *B65G 43/00* (2013.01); *B65G 47/84* (2013.01); *B65G 2207/48* (2013.01)

(58) Field of Classification Search
CPC .......................... B65G 47/845; B65G 47/844; B65G 2207/36; B65G 47/82; B65G 43/08
USPC ...................................... 198/370.02
See application file for complete search history.

(56) References Cited

U.S. PATENT DOCUMENTS

| | | | |
|---|---|---|---|
| 4,458,809 A * | 7/1984 | White .................... | B65G 13/07 198/789 |
| 4,738,347 A | 4/1988 | Brouwer et al. | |
| 5,127,510 A | 7/1992 | Cotter et al. | |
| 5,165,515 A | 11/1992 | Nitschke et al. | |
| 5,613,591 A * | 3/1997 | Heit ..................... | B65G 47/844 198/370.02 |
| 6,168,011 B1 | 1/2001 | Morsbach | |
| 6,860,383 B2 | 3/2005 | Veit et al. | |

(Continued)

OTHER PUBLICATIONS

International Search Report and Written Opinion of the International Searching Authority from corresponding Patent Cooperation Treaty (PCT) Application No. PCT/IB22/57095, indicated completed on Sep. 30, 2022.

*Primary Examiner* — James R Bidwell
(74) *Attorney, Agent, or Firm* — Gardner, Linn, Burkhart & Ondersma (57) ABSTRACT

A tolerance adjuster and wear device, e.g. spring clip, is provided for automatically adjusting the tolerance or clearance between a pusher shoe surface and an adjacent surface of a linear slat of a positive displacement sorter. The spring clip includes an engagement portion to couple the clip to a pusher shoe and a wear portion to automatically bias or adjust a tolerance between the pusher shoe and a corresponding slat. The engagement portion includes a retainer, in the form of a pair of opposing elastic grips or teach that are insertable through a receiver in a surface of the shoe. The wear portion includes a wear surface and spring element, such as a spring arm or convex dome. The spring element is elastic to provide a consistent and automatic bias against the slat surface. Preferably, the spring clip is extruded from a resilient, wear-resistant self-lubricating polymer.

25 Claims, 7 Drawing Sheets

(56) References Cited

U.S. PATENT DOCUMENTS

| | | | |
|---|---|---|---|
| 6,866,136 B2 | 3/2005 | Veit et al. | |
| 7,506,744 B2 * | 3/2009 | Enomoto | B65G 47/844 198/370.02 |
| 8,631,924 B2 * | 1/2014 | Vlug | B65G 47/84 198/370.02 |
| 2005/0167240 A1 | 8/2005 | Veit | |
| 2005/0284730 A1 * | 12/2005 | Heit | B65G 47/844 198/370.02 |
| 2009/0032374 A1 * | 2/2009 | Heit | B07C 5/362 198/725 |
| 2012/0285812 A1 | 11/2012 | Sekiguchi et al. | |
| 2016/0325315 A1 | 11/2016 | Zimmer et al. | |

* cited by examiner

TOLERANCE ADJUSTER AND WEAR DEVICE FOR SORTATION SYSTEM

CROSS REFERENCE TO RELATED APPLICATION

The present application claims priority of U.S. provisional application Ser. No. 63/226,838, filed Jul. 29, 2021, which is hereby incorporated by reference herein in its entirety.

FIELD OF THE INVENTION

The present invention is directed to a positive displacement sortation system, and in particular to a pusher shoe of a slat and shoe sortation system.

BACKGROUND OF THE INVENTION

Positive displacement sortation conveyors are known having a main conveying surface and diverter shoes that are generally used to displace articles laterally on the main conveying surface, such as when the articles are to be diverted upon one or more spur conveyor lines typically placed at an angle to the main conveying surface. Such conveyors may include a pair of endless chains and a plurality of members, such as linear slats, connected at their opposite ends to the chains in order to provide a moving conveyor surface. Each slat, or a pair of slats, is fitted with a pusher or diverter shoe mounted in a manner such that the shoe moves laterally across the slat(s) and perpendicular to the forward conveyance direction of the conveyor. Movement of the shoe is guided by a guide track beneath the conveying surface. At the loading end of the sortation system, the shoes have a particular orientation with respect to the conveying surface. When an article is to be diverted to a particular spur line, a diverter assembly is actuated to switch shoes adjacent the article onto one or more diagonal tracks causing the effected shoes to glide across the slats to divert the article.

In many instances, sortation conveyors are susceptible to damage in the form of impact damage and/or surface wear from contact friction between moving parts. For example, the portion of the pusher shoe that engages the guide track may fatigue over its lifetime and may ultimately crack or break away from the rest of the shoe, thus requiring time consuming service to replace the damaged shoe. Excessive wear on the shoe or slat may require service to repair or replace the worn item. Sound and noise issued from the sorter during typical operation is a nuisance and a potential health and safety hazard for those working in the vicinity of the sortation conveyor. Sources of noise during operation include impacts between the shoe and slat (e.g. slapping, chattering, and/or vibrating) and resonance in the slat which may function similar to a chime or bell as the shoe glides across the slat.

SUMMARY OF THE INVENTION

The present invention provides a wear part for positive displacement sortation systems, such as linear slat and shoe sorters. The wear part is provided in the form of a replaceable clip device that automatically adjusts a tolerance or clearance between a pusher shoe and a slat of the sorter. The clip is particularly well-suited for reducing sound produced during operation of sorters which may typically be caused due to excessive tolerance or clearance between the shoe and slat which may allow the shoe to rattle, slap, vibrate, and the like as the shoe glides along the slat. The clip is formed of a resilient material which preferably exhibits improved wear resistance as compared to the material forming the body of the pusher shoe. As such, the clip device reduces sound and reduces wear on the shoe by provided a wear resistant, automatic tolerance or clearance adjusting mechanism for the shoe. While the clip device is particularly beneficial for reducing sound and wear in shoe and slat sorters, the clip device may provide benefits in many other sortation systems as well as many other material handling systems.

According to one form of the present invention, a tolerance adjuster and wear device or clip is provided for automatically adjusting the tolerance or clearance between a pusher shoe and linear slat of a positive displacement shoe and slat sorter. The clip has a unitary body having an engagement portion for releasably coupling the clip with the pusher shoe and a wear portion configured to automatically bias or adjust a tolerance between the pusher shoe and a slat of the shoe and slat sorter. The engagement portion includes a retainer that is insertable through a receiver (e.g. hole) in an internal surface of the shoe to retain the clip within the shoe during normal operation of the shoe and slat sorter. Preferably, the unitary body is formed of a self-lubricating polymer.

In one aspect, the retainer includes a set of teeth each configured to releasably engage an internal surface proximate the underside of the shoe such that the tolerance adjuster and wear device is positioned between the lower internal surface of the shoe and a lower exterior surface of the slat. The wear portion may include a spring element to apply a substantially constant bias against the slat to maintain the shoe at a generally consistent spacing away from the slat. In one aspect, the spring element may include a plurality of spring arms. When the clip is coupled to the shoe, each spring arm extends from an outer central portion of the unitary body upwardly away from the shoe surface and inwardly toward a middle portion of the clip. In another aspect, the spring element may include a convex dome extending arcuately, upwardly from the shoe surface and the engagement element.

In another form of the present invention, a positive displacement sorter is provided for sorting items in a material handling solution and the sorter includes multiple interconnected slats defining an endless web which defines a conveying surface. The sorter includes a multiple pusher shoes gliding along at least some of the slats to laterally displace articles on the conveying surface. The sorter further includes a plurality of wear parts in the form of tolerance adjustment and wear clips which are disposed between at least some of the slats and some of the pusher shoes. Preferably, each of the clips is releasably and replaceably coupled to a respective one of the pusher shoes.

In one aspect, each of the clips includes a unitary body having an engagement portion for releasably coupling the clip with the pusher shoe and a wear portion configured to bias the portion of the pusher shoe having the clip away from the slat and also reduce wear on the shoe which may be caused when/if the shoe contacts the slat.

In another aspect, each of the pusher shoes includes one or more receivers in spaced arrangement at an upper portion of the lower interior surface of the pusher shoe, each receiver is defined by a hole through the lower interior surface of the shoe. Each receiver hole is provided for receiving a portion of the engagement portion of the clip.

In yet another form of the present invention, a biasing and wear device or spring clip is provided for automatically adjusting or biasing the tolerance or clearance between a pusher shoe and a linear slat of a positive displacement sorter. The sorter includes a plurality of interconnected slats that define an endless web conveying surface and a plurality of pusher shoes which glide or are glidable along at least some of the slats. The clip includes an upper portion for biasing a portion of a pusher shoe away from an adjacent surface of a corresponding slat and a lower portion for releasably coupling the biasing and wear device to the pusher shoe proximate a surface of the pusher shoe that is adjacent to the corresponding slat. The upper portion includes a set of spring arms configured to contact the surface of the slat adjacent to the pusher shoe to continuously and automatically bias the surface of the pusher shoe away from the adjacent surface of the slat. The lower portion includes a set of opposing grips that cooperate to retain the clip within a receiver hole that is formed through an interior surface of the pusher shoe, adjacent the slat. The set of opposing grips are selectively releasable, such as by squeezing the clips together, to release the grips from the receiver hole to remove the clip from the pusher shoe.

In still another form of the present invention, a method is provided for biasing a pusher shoe of a positive displacement sorter away from or at a consistent tolerance relative to a linear slat of the sorter in order to maintain a desired tolerance between the pusher shoe and the linear slat of the sorter. The method includes providing the sorter, including the linear slats and pusher shoes. The slats define an endless web that defines a conveying surface. A plurality of pusher shoes are configured to glide along the slats to laterally displace articles on the conveying surface. The method further includes providing a biasing and wear device or spring clip between one or more of the pusher shoe and a corresponding linear slat of the sorter. The biasing and wear device is removably coupled to the pusher shoe. The biasing and wear device is provided for automatically biasing an interior surface of the pusher shoe away from an adjacent exterior surface of the linear slat. Optionally, the method may include removing the clip from the pusher shoe and installing a different clip in the pusher shoe to replace the removed clip.

Accordingly, a method and device are provided for automatically biasing against a surface of a linear slat of a sorter to maintain a generally consistent tolerance or clearance between the slat and a pusher shoe installed on and gliding along the slat. The device is provided in the form of a spring clip that includes an engagement portion to couple the clip to a pusher shoe, and a wear portion that provides a wear surface as well as an elastic biasing spring element to maintain a desired tolerance or clearance between the shoe and slat. The spring clip is selectively removable such that it may be replaced as necessary, such as when the clip has exceeded its useful life. The clip is preferably formed from a self-lubricating and resilient polymeric material.

These and other objects, advantages, purposes and features of this invention will become apparent upon review of the following specification in conjunction with the drawings.

DESCRIPTION OF THE PREFERRED EMBODIMENTS

Figure 4:
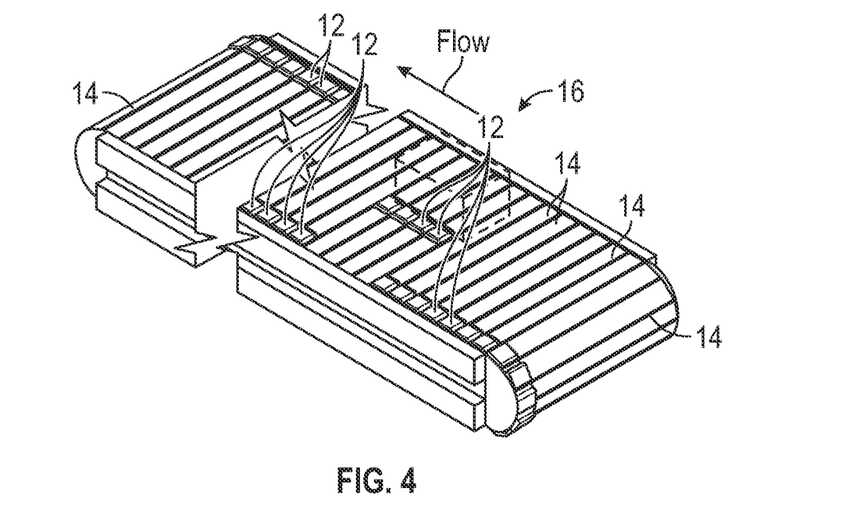
FIG. 4 is a perspective view of a positive displacement shoe and slat sorter.
Figure 5:
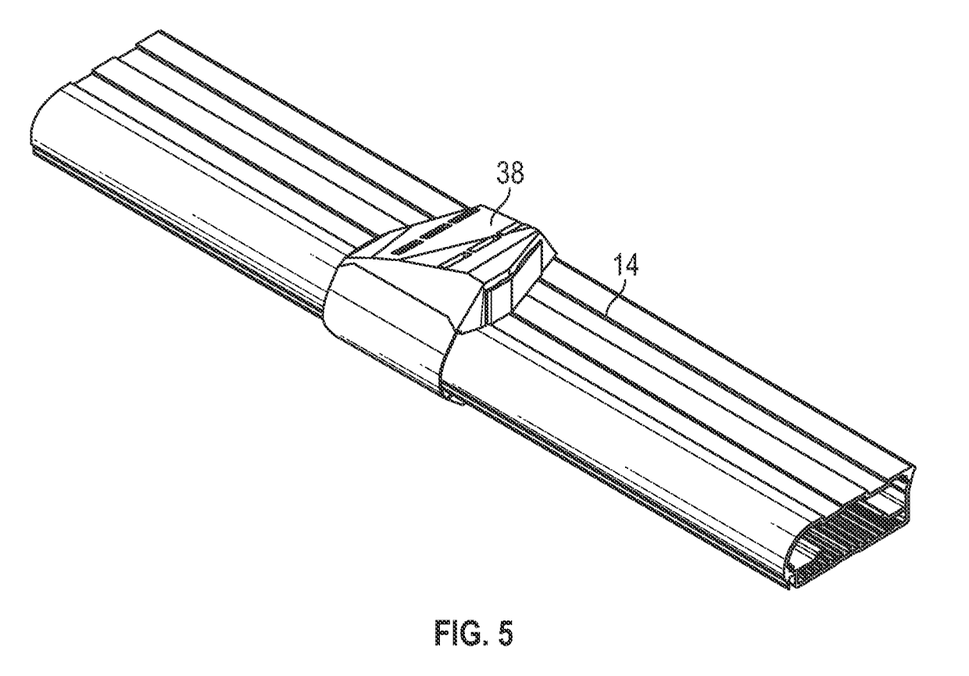
FIG. 5 is a perspective view of another pusher shoe and a slat of a positive displacement shoe and slat sorter.
Figure 6:
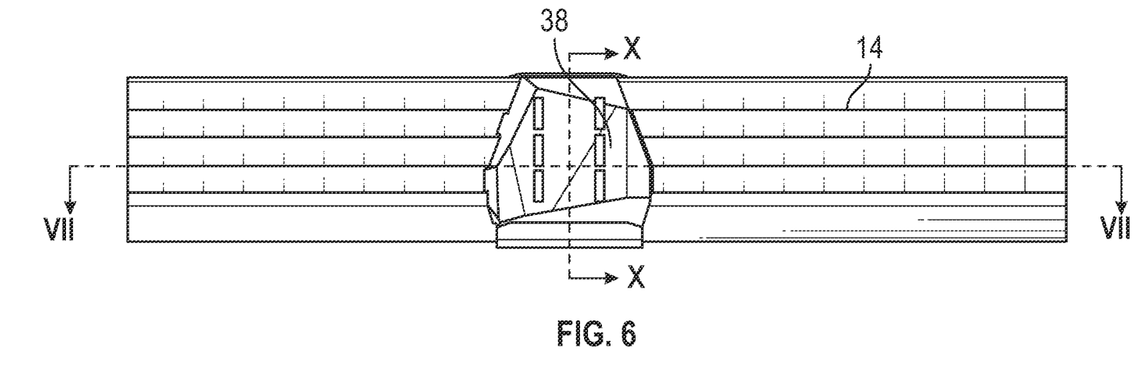
FIG. 6 is a plan view of the pusher shoe and slat of FIG. 5.

Referring now to the drawings and the illustrative embodiments depicted therein, a tolerance adjusting/biasing and wearing part, device, or spring clip 10 (FIGS. 1-2) is provided for automatically biasing or adjusting the tolerance, gap, or slop between a pusher shoe 12 and a slat 14 of a positive displacement sorter 16 (FIG. 4). The clip 10 provides a wear surface between the shoe 12 and the slat 14, and as such, defines a wear part for use in the sorter 16 to extend the operational life of the shoes 12 and the slats 14. The clip 10 is particularly useful in positive displacement sortation systems, such as linear slat and pusher shoe sorters similar to those described in commonly owned and assigned U.S. Pat. Nos. 4,738,347, 5,127,510, 5,165,515, 6,814,216, 6,860,383, 6,866,136, 7,086,519, 7,117,988, and 7,513,356, the disclosures of which are hereby incorporated herein by reference in their entireties. The clip 10 provides several benefits including reducing wear on the pusher shoe 12, reducing shaking, chatter, vibration, etc. as the shoe 12 glides along the slat 14, and reducing noise during operation of the sorter 16. The clip 10 is preferably formed of a self-lubricating polymer, such as ultra-high molecular weight polyethylene (UHMW), for example.

Referring to the illustrative embodiments of FIGS. 1-11, the clip 10 is shown as installed on multiple different but generally similar embodiments of a pusher shoe. For purposes of this disclosure, the clip 10 is generally identical or substantially similar in shape, dimension, and function in each of the illustrated embodiments of FIGS. 1-4 and 5-11, respectively, the clip is thus referred to throughout as clip 10 in each embodiment. While the clips 10 and exemplary sorters of the illustrative embodiments of FIGS. 1-11 and described below have generally similar shapes and form, it will be appreciated that the tolerance adjusting/biasing and wearing part, device, or clip may be shaped and dimensioned differently as desired or required to fit various different known and/or contemplated pusher shoe configurations without significantly altering the function and benefits of the invention (see clip 42 of FIGS. 12 and 13, for example).

Figure 1:
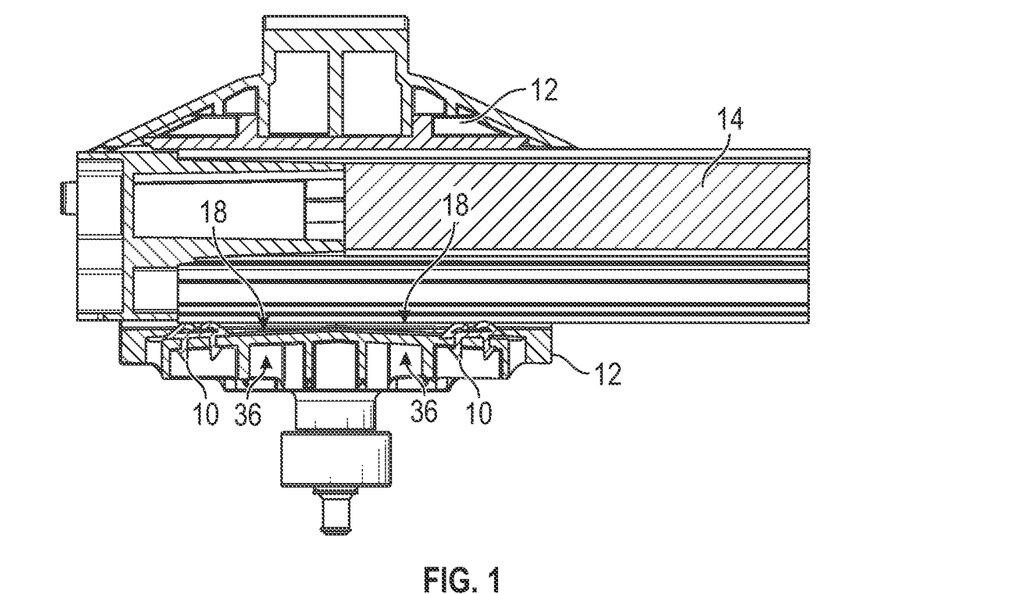
FIG. 1 is a sectional side view of a portion of a positive displace sorter including a tolerance adjuster and wear device for pusher shoe of the sorter, in accordance with the present invention.

Referring now to the illustrative embodiment of FIG. 1, the clip 10 is coupled to a lower interior surface 18 of the pusher shoe 12 (clip 10 will be further discussed below with regard to another illustrative embodiment of a sorter for use with pusher shoe 38 of FIGS. 5-11). While the pusher shoes 12 and slats 14 change orientation as they traverse over and under the sorter 16, for purposes of this disclosure any references to orientation are provided relative to the orientation of the pusher shoe 12 and slat 14 as shown in FIG. 1. The clip 10 is positioned between the lower interior surface 18 of the pusher shoe 12 and a lower exterior surface 20 of the slat 14 (FIG. 1). Clip 10 contacts surface 20 of the slat 14 in a substantially constant manner as the pusher shoe 12 glides along the slat 14. In this manner, the pusher shoe 12 retains a generally consistent longitudinal position relative to the slat 14, thereby reducing slop or play between the shoe 12 and slat 14 that may cause shaking, chatter, vibration, etc. as the shoe glides along the slat 14. While the illustrated embodiment of FIG. 1 depicts a clip 10 installed proximate each of the outer ends of the pusher shoe 12, it will be appreciated that more or fewer clips 10 may be provided at different spacing intervals along the lower interior surface 18 of the pusher shoe 12 without substantially affecting the functionality of the clip 10, shoe 12, and sorter 16.

Figure 2:
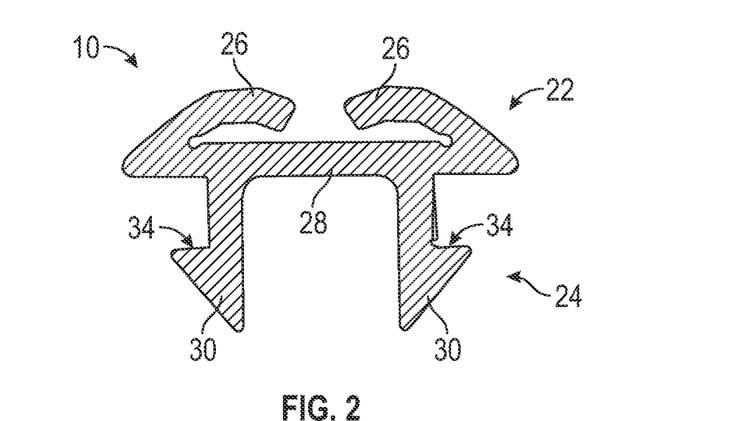
FIG. 2 is an enlarged side perspective view of the pusher shoe of FIG. 1.
Figure 3:
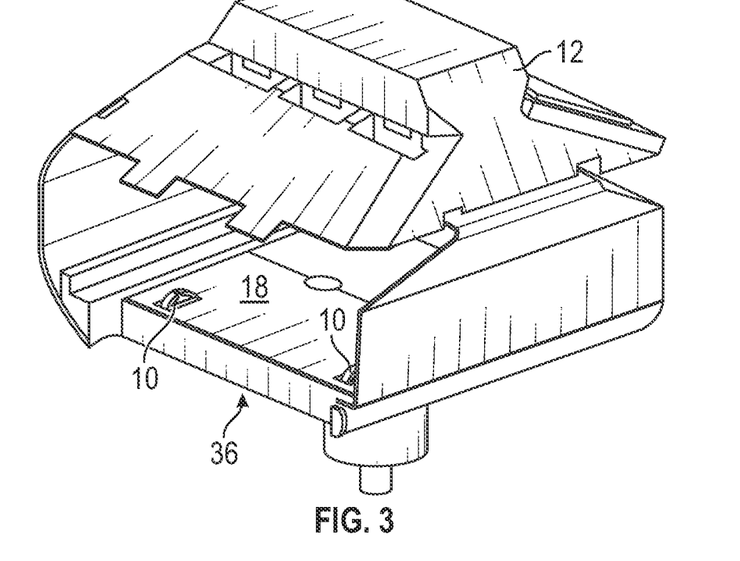
FIG. 3 is a sectional side view of the tolerance adjuster and wear device of FIG. 1.

The clip 10 is defined by a unitary clip body that includes an upper or wear portion 22 that defines the wear surface or contact surface of the clip and a lower engagement or coupling portion 24 (FIG. 2) for releasably connecting the clip 10 to the pusher 12. The upper portion 22 of clip 10 includes a spring element, in the form of a pair or set of elastic spring arms 26, which contacts the lower exterior surface 20 of the slat 14 when the pusher shoe 12 is installed on the slat 14. A proximal end of each spring arm 26 is attached at an outer edge of a central portion or body 28 of clip 10. The spring arm 26 extends upwardly away from the shoe 12 and toward the lower exterior surface of the slat 14 (when the shoe is installed on the slat), as well as inwardly from the outer exterior edge of central portion 28 toward a middle portion or center of clip 10 (FIG. 2). The shape and dimension of the spring arm 26 is such that a middle portion and/or distal end of the spring arm contacts the slat 14. The spring arms 26 are elastic such that they maintain a consistent or generally constant bias against the surface 20 of the adjacent slat 14. Thus, the clip 10 continuously and automatically biases the surface of the pusher shoe 12 away from the adjacent surface of the slat 14. The clip 10 may also be positioned between an upper interior surface of the shoe and an upper exterior surface of the slat while providing substantially similar function compared to the illustrated embodiment. Further, clips 10 may be positioned at the upper and lower interior surfaces of the shoe, if desired. It will also be appreciated that clips 10 may be positioned at the sides of the pusher shoe 12 along the interior surface of the shoe, to provide lateral tolerance adjustment and wear resistance for the shoe.

While the spring element of the illustrative embodiment of clip 10 is described as a pair of spring arms 26, it will be appreciated that the spring element and/or wear surface of the tolerance adjusting/biasing and wearing part, device, or clip may be shaped and dimensioned in many different ways. For example, the spring element may be defined by one or more spring arms which may be attached to the clip body at various positions. As another example, the spring element may be formed by a convex dome, such as described for clip 42 of the illustrative embodiment of FIG. 12-13, as described in further detail below.

Lower portion 24 includes an engagement element having a retainer in the form of a pair of opposing, flexible teeth or grips 30 attached to the central portion 28 of the clip body and extending away from the central portion 28 opposite the upper portion 22 (FIG. 2). The central portion 28 extends outwardly beyond the outer edge of each of the grips 30. The grips 30 cooperate with one another to retain the clip 10 within a receiver hole formed through the lower interior surface 18 of the pusher shoe 12 (see FIG. 9 for illustration of a receiver hole 32 in the surface of a pusher shoe). The grips 30 are selectively releasable from the receiver hole such that the clip 10 may be removed from the shoe 12 and subsequently replaced. Grip 30 is elastic such that it is resilient and thus automatically returnable to an initial shape or form after being deformed or displaced from the initial form. Grip 30 includes a tooth extension 34 that engages or grips the underside 36 of the material forming the lower interior surface 18 of the shoe 12 (FIGS. 1-2). The distance between the central portion 28 and the extension 34 is slightly larger than the thickness of the material forming the lower interior surface 18 of the shoe 12. As such, the extension 34 may cover and engage the underside of the shoe surface 18 to retain the clip 10 on the pusher shoe 12.

A distal end of the grip 30 is sloped at an oblique angle from the inner end of the grip toward the outer edge of the clip 10. The end of the sloped portion of the grip 30 defines the extension 34. The sloped portion enables the grips 30 of the clip 10 to be insertable into the receiver hole. As the lower portion 24 is urged or inserted into the receiver hole, the rigid receiver hole urges the sloped portions of the grips 30 to move inward toward one another. Once the extensions 34 have cleared the material of the shoe surface 18, the grips 30 recoil or return, at least partially, to their initial form and thereby cover and engage the underside of the shoe surface 18. To remove the clip 10, an operator urges or squeezes one or both of the grips 30 inward toward one another until the extensions 34 have cleared the edge of the receiver hole, at which point the clip 10 may be pushed upward through the receiver hole. The removability of the clip enables an operator to replace broken, worn-out, defective, or otherwise unwanted clips 10 from the pusher shoe 12 and replace them with a different clip 10, such that a clip 10 may be simply replaced instead of replacing an entire shoe 12 or slat 14, which may otherwise be subject to wear, degradation, and damage without the clip 10 installed.

While the engagement element of the illustrative embodiment of clip 10 is described as a pair of opposing, flexible teeth or grips 30, it will be appreciated that the engagement element of the tolerance adjusting/biasing and wearing part, device, or clip may be shaped and dimensioned in many different ways. Additionally, other known releasable fasteners may be provided to couple the clip to the pusher shoe. For example, the engagement element may include a push—in rivet type fastener that includes an array of finials or ribs along a shaft of the fastener in which the ribs engage the pusher shoe.

The unitary body of the clip 10 is preferably formed of a wear resistant material having self-lubricating properties, such as UHMW, for example. Preferably, clip 10 is formed by an extrusion process. It is contemplated that the clip 10 may be installed or provided with new installations of pusher shoes for sortation systems. It is further contemplated that legacy pusher shoes may be retrofitted to receive one or more clips 10. Thus, the clip may provide a wear part or wearing surface for retrofitted pusher shoes which may otherwise fail prematurely due to wear caused by rubbing the slat or due to vibration and impact caused by a lose fitment between the shoe and slat, for example.

Figure 7:
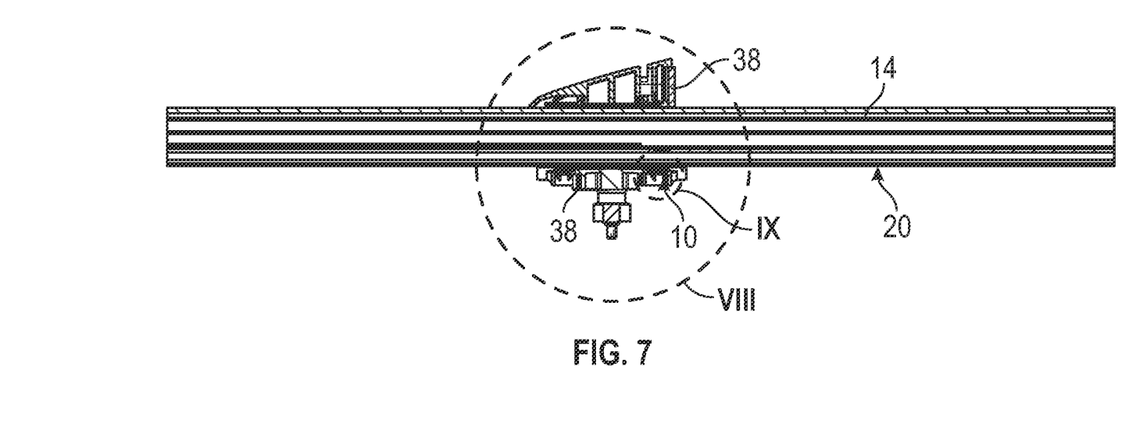
FIG. 7 is a sectional side view of the pusher shoe and slat of FIG. 5, taken along line VII-VII of FIG. 6.
Figure 8:
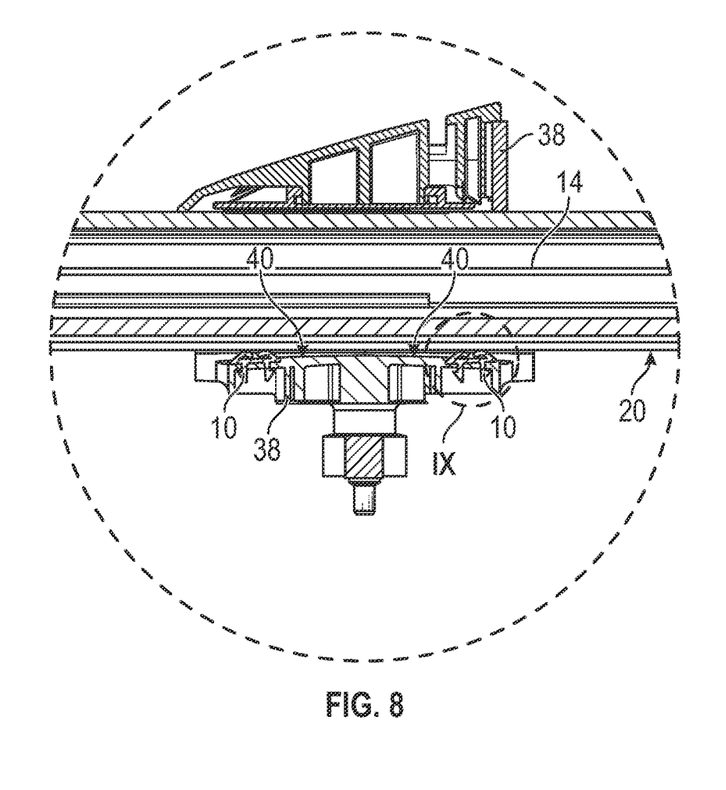
FIG. 8 is an enlarged view of the region designated VIII in FIG. 7, including a tolerance adjuster and wear device in accordance with the present invention, the tolerance adjuster and wear device coupled with the shoe of FIG. 5.
Figure 9:
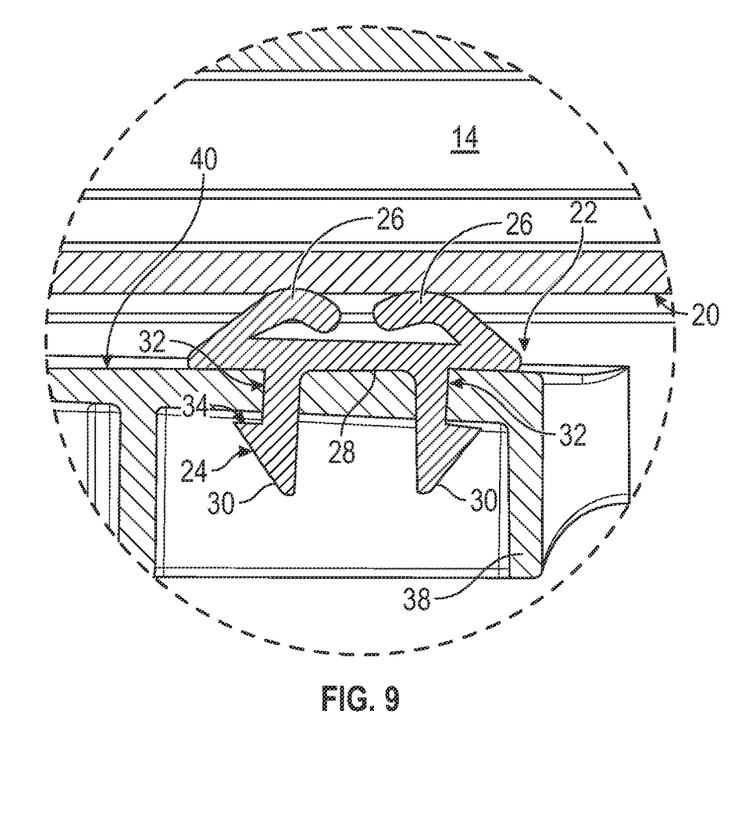
FIG. 9 is an enlarged view of the region designated IX in FIGS. 7 and 8.
Figure 10:
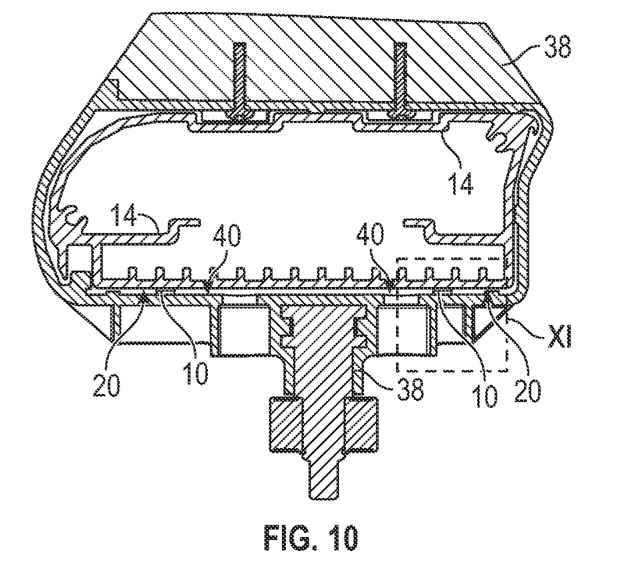
FIG. 10 is a sectional side view of the pusher shoe and slat of FIG. 5, taken along line X-X of FIG. 6.
Figure 11:
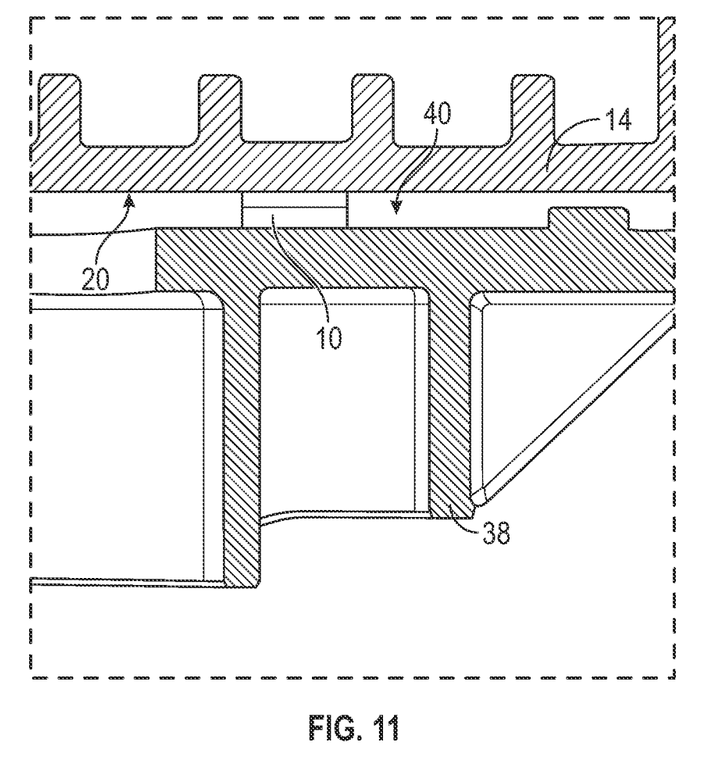
FIG. 11 is an enlarged view of the region designated XI in FIG. 10.

Referring now to the illustrative embodiment of FIGS. 5-11, the clip 10 is provided for another pusher shoe 38 embodiment that glides along a slat 14 of a positive displacement sorter. Pusher shoe 38 operates in a substantially identical or similar fashion to that of pusher shoe 12. Similar to pusher shoe 12 of the illustrative embodiment of FIGS. 1-4, pusher shoe 38 is disposed around the slat 14 and includes a lower interior surface 40 that is adjacent to the slat lower surface 20 when the shoe is installed on the slat (FIGS. 7-8). A set of four receiver holes or receivers 32 are formed through the lower interior surface 40 of the shoe 38 and the holes 32 receive the engagement element on the lower portion 24 of the clip 10. The clip 10 is insertable and releasable with the receiver holes 32 in similar manner to that described above for illustrative embodiments of FIGS. 1-4.

Figure 12:
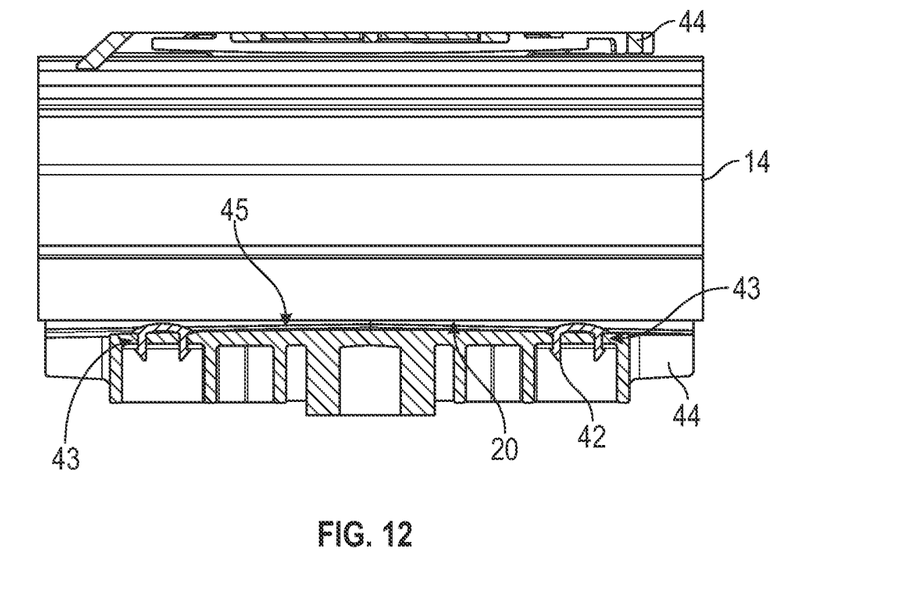
FIG. 12 is an enlarged view of a portion of another shoe and slat sorter, including a set of tolerance adjuster and wear devices in accordance with the present invention, the tolerance adjuster and wear device coupled with a shoe of the sorter.
Figure 13:
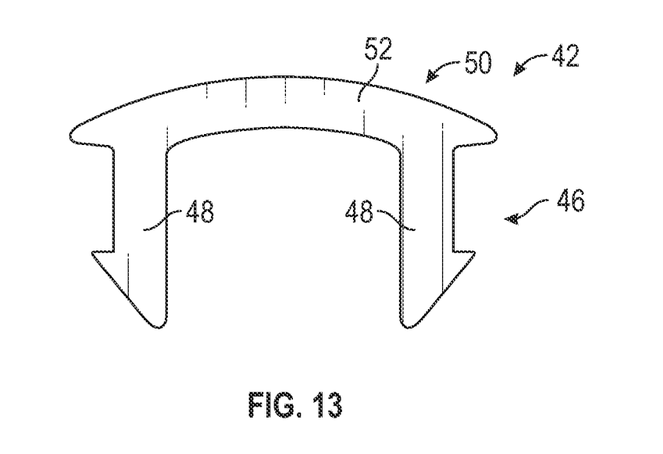
FIG. 13 is a sectional side view of one of the tolerance adjuster and wear devices of FIG. 12.

Referring now to the illustrative embodiment of FIGS. 12-13, another tolerance adjusting/biasing and wearing part, device, or clip 42 is provided for automatically biasing or adjusting the tolerance, gap, or slop between a pusher shoe 44 and a slat 14 of a positive displacement sorter. Clip 42 has many structural similarities to that of clip 10, with significant differences described hereinafter. The clip 42 is insertable and removable at a receiver hole 43 formed in the lower interior surface 45 of the pusher shoe. The unitary body of clip 42 includes a lower portion 46 having an engagement element in the form of a pair of opposing grips 48 (FIG. 13) which are substantially identical or similar in structure and function as that of grips 30 of clip 10 described above. The clip 42 includes an upper or wear portion 50 coupled to the lower portion 46. The wear portion 50 defines a wear surface or contact surface of the clip 42 and includes a spring element, in the form of a convex dome 52 curving upwardly at its center away from the lower portion 46. The upper portion of the convex dome 52 contacts the lower exterior surface 20 of the slat 14 while the pusher shoe 44 is installed on the slat 14 (FIG. 12). The grips 48 extend downwardly away from the convex dome 52 and are positioned toward the outer edges of the dome 52. The dome 52 extends outwardly beyond the outer edge of each of the grips 48. The dome 52 is elastic to maintain a bias against the surface 20 of the slat 14.

A method is provided for biasing a pusher shoe 12 of a positive displacement sorter 16 away from or at a generally consistent tolerance relative to a linear slat 14 of the sorter 16 in order to maintain a desired tolerance between the pusher shoe 12 and the linear slat 14 of the sorter (FIGS. 1 and 4). The method includes providing a positive displacement sorter in the form of a linear slat and shoe sorter 16 which includes a plurality of interconnected slats 14. The slats 14 define an endless web that defines a conveying surface and a plurality of pusher shoes 12 configured to glide along the slats 14 to laterally displace articles on the conveying surface (FIG. 4). The method further includes providing a biasing and wear device 10 between one or more of the pusher shoes 12 and a corresponding linear slat 14 (FIG. 1). The biasing and wear device 10 is removably coupled to the pusher shoe 12. The biasing and wear device 10 is provided for automatically biasing an interior surface 18 of the pusher shoe 12 away from an adjacent exterior surface 20 of the linear slat 14. The method may include removing the biasing and wear device 10 from the pusher shoe 12 and installing a different biasing and wear device 10 in the pusher shoe 12 to replace the removed device 10.

Thus, the present invention provides an automatic biasing wear part/tolerance adjuster and wear device in the form of a spring clip to automatically adjust the tolerance or clearance between a pusher shoe surface and an adjacent surface of a linear slat of a positive displacement sorter. The spring clip is provided for reducing noise during operation of the sorter that may be caused by vibration, slapping, and/or shaking of the shoe as it glides along the slat. The spring clip also provides a wear part that is readily removable and replaceable which may extend the service life of the pusher shoe. The spring clip includes a retainer in the form of a releasable grip to attach the clip to a pusher shoe, and a wear surface provided by a spring element, such as a spring arm or convex dome, which automatically biases or adjusts a tolerance between the pusher shoe and a corresponding slat. The spring element is elastic to provide a consistent and automatic bias against the slat surface. Preferably, the spring clip is extruded from a resilient, wear-resistant self-lubricating polymeric material.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A tolerance adjuster and wear device for a pusher shoe of a positive displacement shoe and slat sorter, said tolerance adjuster and wear device comprising:
   a unitary body comprising:
      an engagement portion for releasably coupling said tolerance adjuster and wear device with the pusher shoe; and
      a wear portion configured to automatically adjust a tolerance between the pusher shoe and a slat of the shoe and slat sorter.

2. The tolerance adjuster and wear device of claim 1, wherein said engagement portion comprises a retainer that is insertable through a receiver in an interior surface of the shoe to couple said tolerance adjuster and wear device with the shoe.

3. The tolerance adjuster and wear device of claim 2, wherein said retainer comprises a set of teeth each configured to releasably engage an underside of the interior surface of the shoe.

4. The tolerance adjuster and wear device of claim 1, wherein said wear portion comprises a spring element configured to bias the portion of the shoe having said tolerance adjuster and wear device away from the slat.

5. The tolerance adjuster and wear device of claim 4, wherein said spring element comprises a plurality of spring arms each of which, extend from an outer central portion of said unitary body away from the shoe and toward a middle portion of said tolerance adjuster and wear device.

6. The tolerance adjuster and wear device of claim 4, wherein said spring element comprises a convex dome extending upwardly from said engagement portion.

7. The tolerance adjuster and wear device of claim 1, wherein said unitary body comprises a self-lubricating polymer.

8. The tolerance adjuster and wear device of claim 1, wherein said wear portion configured to bias a portion of the pusher shoes away from an adjacent surface of the slat, said engagement portion configured to releasably couple said tolerance adjuster and wear device to the pusher shoe proximate a surface of the pusher shoe that is adjacent to the slat.

9. The tolerance adjuster and wear device of claim 8, wherein said wear portion comprises a spring element configured to contact the surface of the slat adjacent to the pusher shoe to continuously and automatically bias the surface of the pusher shoe away from the adjacent surface of the slat, and said engagement portion comprises a set of opposing grips that cooperate to retain said tolerance adjuster and wear device within a receiver hole formed through the surface of the pusher shoe adjacent the slat, wherein said set of opposing grips are selectively releasable from the receiver hole for removing said tolerance adjuster and wear device from the pusher shoe.

10. The tolerance adjuster and wear device of claim 9, wherein said spring element comprises a set of spring arms, each of which, extend from an outer central portion of said unitary body away from the shoe and toward a middle portion of said tolerance adjuster and wear device.

11. The tolerance adjuster and wear device of claim 9, wherein said spring element comprises a convex dome extending upwardly from said engagement portion.

12. A positive displacement sorter comprising:
a plurality of interconnected slats defining an endless web, said web defining a conveying surface;
a plurality of pusher shoes gliding along at least some of said slats to laterally displace articles on said conveying surface; and
a plurality of tolerance adjustment and wear clips disposed between at least some of said slats and some of said pusher shoes, each of said clips releasably coupled to one of said pusher shoes.

13. The sorter of claim 12, wherein each of said clips comprises a unitary body having an engagement portion for releasably coupling said clip with said pusher shoe and a wear portion configured to bias the portion of said pusher shoe having said clip away from said slat.

14. The sorter of claim 13, wherein at least one of said pusher shoes comprises four receivers in spaced arrangement at an upper portion of a lower interior surface of said pusher shoe, each of said receivers defined by a hole through the lower interior surface of said shoe and configured to receive a portion of said engagement portion of said clip.

15. The sorter of claim 12, wherein each of said clips defines a wear part of said sorter that is readily removable from said pusher shoe and replaceable with another clip.

16. The sorter of claim 12, wherein each of said clip comprises:
a unitary body having an upper portion configured to bias a portion of one of the pusher shoes away from an adjacent surface of a corresponding one of the slats, and a lower portion configured to releasably couple said clip to one of the pusher shoes proximate a surface of the pusher shoe that is adjacent to the corresponding slat;
said upper portion comprising a spring element configured to contact the surface of the slat adjacent to the pusher shoe to continuously and automatically bias the surface of the pusher shoe away from the adjacent surface of the slat; and
said lower portion comprising a set of opposing grips that cooperate to retain said clip within a receiver hole formed through the surface of the pusher shoe adjacent the slat, wherein said set of opposing grips are selectively releasable from the receiver hole for removing said clip from the pusher shoe.

17. The sorter of claim 16, wherein said spring element comprises a set of spring arms, each of which, extend from an outer central portion of said unitary body away from the shoe and toward a middle portion of said clip.

18. The sorter of claim 16, wherein said spring element comprises a convex dome extending upwardly from said lower portion.

19. A method of biasing a pusher shoe to maintain a desired tolerance between the pusher shoe and a linear slat of a positive displacement sorter, said method comprising:
providing a positive displacement sorter having a plurality of interconnected slats defining an endless web further defining a conveying surface of the sorter, and a plurality of pusher shoes configured to glide along at least some of the slats to laterally displace articles on the conveying surface;
providing at least one biasing and wear device between at least some of the pusher shoes and at least some of the linear slats, wherein the biasing and wear device is removably coupled to the pusher shoe; and
automatically biasing an interior surface of the pusher shoe away from an adjacent exterior surface of the linear slat with the biasing and wear device.

20. The method of claim 19, further comprising removing the biasing and wear device from the pusher shoe and installing a different biasing and wear device at the pusher shoe to replace the removed device.

21. A pusher shoe for a positive displacement sorter in which the pusher shoe is configured to move along a slat of the sorter, said pusher shoe comprising:
a base, wherein said base includes an interior surface at least partially defining an opening in said base for receiving a slat, and wherein said interior surface includes a receiving hole; and
a clip removably inserted in said receiving hole;
wherein an end portion of said clip extends from said receiving hole when said clip is inserted in said receiving hole, and wherein said end portion of said clip is configured to contact an outer surface of the slat when said pusher shoe moves along the slat.

22. The pusher shoe of claim 21, wherein said receiving hole comprises a plurality of receiving holes and said clip comprises a plurality of clips with said clips removably inserted in said receiving holes.

23. The pusher shoe of claim 21, wherein said interior surface of said base comprises a lower interior surface, and wherein said end portion of said clip is configured to contact a lower outer surface of the slat when said pusher shoe moves along the slat.

24. The pusher shoe of claim 21, wherein said receiving hole comprises a plurality of receiving holes and said clip comprises a plurality of clips with said clips removably inserted in said receiving holes, and wherein said end portions of said clips comprise a spring portion.

25. The pusher shoe of claim 24, wherein said spring portion of said clips comprise a spring arm.

\* \* \* \* \*